(12) United States Patent
Satpathy et al.

(10) Patent No.: US 9,624,363 B2
(45) Date of Patent: Apr. 18, 2017

(54) EASILY PROCESSABLE ULTRAHIGH MOLECULAR WEIGHT POLYETHYLENE AND A PROCESS FOR PREPARATION THEREOF

(71) Applicant: RELIANCE INDUSTRIES LIMITED, Mumbai, Maharashtra (IN)

(72) Inventors: Uma Sankar Satpathy, Gujarat (IN); Satya Srinivasa Rao Gandham, Gujarat (IN); Ajit Behari Mathur, Gujarat (IN); Raksh Vir Jasra, Gujarat (IN); Krishna Renganath Sarma, Gujarat (IN)

(73) Assignee: Reliance Industries Limited, Mumbai, Maharashtra (IN)

( * ) Notice: Subject to any disclaimer, the term of this patent is extended or adjusted under 35 U.S.C. 154(b) by 0 days.

(21) Appl. No.: 14/650,967

(22) PCT Filed: Dec. 13, 2013

(86) PCT No.: PCT/IN2013/000767
§ 371 (c)(1),
(2) Date: Jun. 10, 2015

(87) PCT Pub. No.: WO2014/091501
PCT Pub. Date: Jun. 19, 2014

(65) Prior Publication Data
US 2015/0307696 A1 Oct. 29, 2015

(30) Foreign Application Priority Data
Dec. 13, 2012 (IN) .......................... 3430/MUM/2012

(51) Int. Cl.
*C08L 23/06* (2006.01)

(52) U.S. Cl.
CPC ......... *C08L 23/06* (2013.01); *C08L 2205/025* (2013.01); *C08L 2205/06* (2013.01); *C08L 2207/068* (2013.01)

(58) Field of Classification Search
CPC ................. C08L 23/06; C08L 2205/06; C08L 2205/025; C08L 2207/068; C08L 2207/06–2207/07
See application file for complete search history.

(56) References Cited

U.S. PATENT DOCUMENTS

| 4,587,163 A | 5/1986 | Zachariades |
|---|---|---|
| 5,037,928 A | 8/1991 | Li et al. |

(Continued)

FOREIGN PATENT DOCUMENTS

| CN | 100532442 C | 8/2009 |
|---|---|---|
| CN | 101531784 A | 9/2009 |

(Continued)

OTHER PUBLICATIONS

International Search Report of PCT/IN2013/000767, mailed Apr. 28, 2014.

(Continued)

*Primary Examiner* — Satya Sastri
(74) *Attorney, Agent, or Firm* — Collard & Roe, P.C.

(57) ABSTRACT

In the present disclosure an easily processable ultrahigh molecular weight polyethylene and a process for preparation thereof is disclosed wherein the easy processable ultrahigh molecular weight polyethylene is prepared by melt mixing a first ultrahigh molecular weight polyethylene having poor process-ability and a second ultrahigh molecular weight polyethylene along with a minimal amount of solvent. The easily processable ultrahigh molecular weight polyethylene is melt processable below its melting point and requires (Continued)

(A)

(B)

(C)

lesser compression molding time as compared to the first ultrahigh molecular weight polyethylene.

11 Claims, 8 Drawing Sheets

(56)                References Cited

U.S. PATENT DOCUMENTS

| | | | |
|---|---|---|---|
| 5,110,663 | A | 5/1992 | Nishiyama et al. |
| 5,422,061 | A | 6/1995 | Takahashi et al. |
| 5,621,070 | A | 4/1997 | Howard, Jr. |
| 5,658,992 | A | 8/1997 | Ehler et al. |
| 5,721,334 | A | 2/1998 | Burstein et al. |
| 6,824,865 | B1 * | 11/2004 | Funaoka ............ B01D 67/0009 428/220 |
| 7,550,555 | B2 | 6/2009 | Smith et al. |
| 7,863,410 | B2 | 1/2011 | Smith et al. |
| 8,003,752 | B2 | 8/2011 | Smith et al. |
| 8,063,175 | B2 | 11/2011 | Smith et al. |
| 2004/0039115 | A1 | 2/2004 | Ishida |
| 2010/0144224 | A1 * | 6/2010 | De Weijer ............ B29C 55/005 442/1 |

FOREIGN PATENT DOCUMENTS

| | | | |
|---|---|---|---|
| CN | 103012907 A | 4/2013 | |
| EP | 0 231 547 A1 | 12/1987 | |
| EP | 0 255 618 A2 | 10/1988 | |
| EP | 0 857 564 A2 | 8/1998 | |
| WO | WO 2007117042 A1 * | 10/2007 | ........... B29C 55/065 |
| WO | 2010139720 A1 | 12/2010 | |
| WO | 2012/146126 A1 | 11/2012 | |

OTHER PUBLICATIONS

Yeh et al, Ultradrawing Gel Films of Blends of Ultrahigh-Molecular-Weight Polyethylene and Low-Molecular-Weight Polyethylenes with Varying Short-Chain Branched Lengths, Polymer Journal, 1998, pp. 1-10, vol. 30, No. 1.

Pandey et al., Heterogeneity in the Distribution of Entanglement Density during Polymerization in Disentangled Ultrahigh Molecular Weight Polyethylene, Macromolecules, 2011, pp. 4952-4960.

* cited by examiner (A)

(B)

(C)

EASILY PROCESSABLE ULTRAHIGH MOLECULAR WEIGHT POLYETHYLENE AND A PROCESS FOR PREPARATION THEREOF

CROSS REFERENCE TO RELATED APPLICATIONS

This application is the National Stage of PCT/IN2013/000767 filed on Dec. 13, 2013, which claims priority under 35 U.S.C. §119 of Indian Application No. 343 0/MUM/2012 filed on Dec. 13, 2012, the disclosures of which are incorporated by reference. The international application under PCT article 21(2) was published in English.

FIELD OF THE DISCLOSURE

The present disclosure relates to a polymer. Particularly, the present disclosure relates to ultrahigh molecular weight polymer. Still more particularly, the present disclosure relates to a process for making easily processable ultrahigh molecular weight polymer.

BACKGROUND

Ultrahigh-molecular-weight polyethylene (UHMWPE) is synthesized from monomers of ethylene, which are bonded together to form ultrahigh-molecular-weight polyethylene (UHMWPE). These molecules of polyethylene are several orders of magnitude longer than high-density polyethylene due to a synthesis process based on metallocene catalysts. In general, HDPE molecules have between 700 and 1,800 monomer units per molecule, whereas UHMWPE molecules tend to have 100,000 to 250,000 monomers each.

UHMWPE is a linear grade polyethylene, as is high-density polyethylene (HDPE), but it possesses a weight average molecular mass (Mw) of at least $7.5 \times 10^5$ g/mol (according to ASTM D4020). Preferably the UHMWPE has a weight average molecular mass of at least $3 \times 10^6$ g/mol. It has extremely long chains, with molecular weight numbering in millions, usually between 2 and 6 million.

The longer chain serves to transfer load more effectively to the polymer backbone by strengthening intermolecular interactions. These result in a very tough material, with the highest impact strength of any thermoplastic presently made. UHMWPE, consisting of mainly hydrogen and carbon molecules has an extremely complex structure, which undergoes complex transformations during processing.

Because of the intrinsic properties related to high values of molecular mass, UHMWPE is widely used in several applications which include high abrasion resistance, high-modulus and high-strength tapes and fibers, biaxial films. However, its extremely high melt viscosity severely affects its process-ability while processing it through conventional techniques, such as screw extrusion or injection molding. Problems that are commonly encountered in processing UHMWPEs include die blockage, melt fracture, wall slippage, and a small processing temperature window.

Processing UHMWPE, therefore, requires a proper combination of temperature, pressure, and sufficient time to achieve complete plasticization. Inadequate control of the process can lead to fusion defects stemming from the memory of the powder morphology. Currently, UHMWPE resin is consolidated mainly by compression molding or rams extrusion. Compression molding progresses slowly and involves costly equipment, whereas ram extrusion is relatively cheap. However, some unconsolidated regions in the center of the material may occur. Considerable efforts have been devoted to developing better methods for UHMWPE processing.

Several approaches have been known to improve the process-ability of UHMWPE. For example, solution processing route is followed to reduce the number of entanglement per chain during the manufacture of uniaxial and the biaxial products. Another approach for reducing the number of entanglements is controlled polymerization using single-site catalytic system (Anurag Pandey, Yohan Champoure and Sanjay Rastogi, *Macromolecules*, 2011, 44 (12), pp 4952-4960).

EP231547 discloses a process for the preparation of polyethylene objects having a high tensile strength and a high modulus by polymerizing ethylene in the presence of a solvent like decalin. Polyethylene produced by the process of EP231547 is only slightly entangled and further disentanglement is easy. The amount of decalin used in the preparations of polyethylene (slightly entangled) for preparing objects like tape, films and the like as disclosed in EP231547 varies between (70-99%).

EP255618 teaches the use of kerosene fraction as a solvent for UHMWPE for preparing a sufficiently disentangled UHMWPE solution. The amount of solvent in such preparations is as high as 90%. An ultrahigh molecular weight polyethylene solution is produced by subjecting a kerosene fraction to UHMWPE which is then cooled to form a gel. UHMWPE is sufficiently disentangled in the solution.

Another method for producing UHMWPE containing compositions with highly beneficial sintering characteristics is disclosed in U.S. Pat. No. 8,063,175. The process includes at least partly disentangling UHMWPE by swelling the UHMWPE with a swelling agent for example decalin and subsequently removing the swelling agent. The swollen polymer comprises about 30% to 99% by weight of swelling agent.

Attempts have also been made to circumvent the intractability of UHMWPE by the addition of solvents, lubricants, plasticizers, and processing aids, as well as polyethylene grades of lower molecular weight as described in U.S. Pat. No. 5,658,992 and U.S. Pat. No. 5,422,061.

Other methods for improving the process-ability of the UHMWPE have been disclosed in U.S. Pat. No. 5,721,334, U.S. Pat. No. 8,003,752, U.S. Pat. No. 7,863,410, U.S. Pat. No. 7,550,555, U.S. Pat. No. 5,621,070, U.S. Pat. No. 5,721,334, U.S. Pat. No. 4,587,163 and U.S. Pat. No. 5,037,928. PCT Publication No. WO2010139720 also discloses a process for preparing disentangled UHMWPE; however it does not deal with the modification of UHMWPE i.e. post polymerization treatment.

OBJECTS

Some of the objects of the present disclosure are described herein below:

It is an object of the present disclosure to ameliorate one or more problems of the prior art or to at least provide a useful alternative.

It is an object of the present disclosure to provide easily processable ultrahigh molecular weight polyethylene that can be processed through compression or sintering processes with reduced time cycles.

It is another object of the present disclosure to provide a process for preparing easily processable ultrahigh molecular weight polyethylene having significantly reduced entanglement.

It is yet another object of the present disclosure to provide an ultrahigh molecular weight polyethylene having improved process-ability that is suitable for the manufacturing of oriented products namely tapes, fiber, film through sintering or compression processes.

Other objects and advantages of the present disclosure will be more apparent from the following description when read in conjunction with the accompanying figures, which are not intended to limit the scope of the present invention.

DEFINITIONS

As used the term "First Ultrahigh Molecular Weight Polyethylene" in the context of the present disclosure refer to a normal or entangled ultrahigh molecular weight polyethylene having a weight average molecular weight (Mw) higher than $1 \times 10^5$ g/mol and a melt elastic modulus build-up >1.0 MPa.

As used the term "Second Ultrahigh Molecular Weight Polyethylene" in the context of the present disclosure refer to a disentangled ultrahigh molecular weight polyethylene having a weight average molecular weight (Mw) of at least $2 \times 10^6$ g/mol and a melt elastic modulus build-up <1.0 MPa.

As used the term "resultant easily processable Ultrahigh Molecular Weight Polyethylene" in the context of the present disclosure refer to a modified matrix of ultrahigh molecular weight polyethylene having significantly reduced entanglement compared to the normal or entangled first ultrahigh molecular weight polyethylene and characterized by having a weight average molecular weight of at least $1 \times 10^6$ g/mol and melt elastic modulus build-up below 1.0 MPa, preferably <1.0 MPa, wherein the easy processable ultrahigh molecular weight polyethylene is melt processed at a temperature below its melting temperature range and requires lesser compression molding time as compared to the normal or entangled first ultrahigh molecular weight polyethylene.

The term "disentangled ultrahigh molecular weight polyethylene" used in the context of the present disclosure refers to a homo-polymer or copolymer of ethylene having molar mass in the range of 2 Million to 15 Million, heat of fusion in the range of 180 J/g to 250 J/g and bulk density in the range of 0.03 g/cc to 0.2 g/cc and initial elastic modulus value is 1.0 MPa, preferable <1.0 MPa of the melt when measured by Dynamic rheometry (strain: 0.5%, frequency: 10 rad/s, temperature: 180° C.) and the same increase with time and attain plateau at ~1.6 MPa".

The use of the terms "first", "second", "resultant" and the like does not imply any particular order, but they are included to identify individual elements. Moreover, the use of the terms first, second, and the like or "resultant" does not denote any order or importance, but rather the terms first, second and the like are used to distinguish one element from another.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the invention to achieve one or more of the desired objects or results.

SUMMARY

In accordance with one aspect of the present disclosure, there is provided a method of preparing easily processable ultrahigh molecular weight polyethylene, said method comprising the step of adding to a first ultrahigh molecular weight polyethylene having an weight average molecular weight higher than $1 \times 10^5$ g/mol and a melt elastic modulus build-up >1.0 MPa, a second ultrahigh molecular polyethylene in an amount ranging between 20% to 60% having an weight average molecular weight of at least $2 \times 10^6$ g/mol and a melt elastic modulus build-up of below 1.0 MPa and a solvent in a weight proportion of less than 20% by weight of the total polymer to obtain a mixture; and stressing the mixture by melt mixing the same to obtain a resultant easily processable ultrahigh molecular weight polyethylene characterized by having a melt elastic modulus build-up <1.0 MPa, enhanced thermal properties as compared to the first ultrahigh molecular weight polyethylene and the melt processing temperature typically below its melting temperature.

Typically, the weight proportion of the solvent is not more than 10%, preferably below 10% to obtain easily melt processable ultrahigh molecular weight polyethylene.

Typically, the first and the second ultrahigh molecular weight polyethylenes, and the solvent are melt mixed at a temperature ranging between 110° C. and 160° C.

Typically, the solvent is selected from the group of solvents consisting of high boiling solvents, low boiling solvents and any combinations thereof.

Typically, the solvent is a high boiling solvent, said solvent being selected from the group consisting of decalin and paraffin.

Typically, the solvent is a low boiling solvent, said solvent being selected from the group consisting of acetone, isopropanol, ethyl methyl ketone and any combinations thereof.

Preferably, the solvent is selected from the group consisting of decalin, acetone, paraffin and any combinations thereof.

Still more preferably, the solvent is acetone with a water content ranging between 80 ppm and 700 ppm.

Typically, the first ultrahigh molecular weight polyethylene is entangled ultrahigh molecular weight polyethylene having melting temperature (Tm) typically ranging between 132° C. and 138° C. and heat of fusion ($\Delta H$) 120-140 J/g.

Typically, the first ultrahigh molecular weight polyethylene is melt processed at or above its melting temperature range.

Typically, the second ultrahigh molecular weight polyethylene is disentangled ultrahigh molecular weight polyethylene.

In another aspect, the present disclosure provides an easily processable ultrahigh molecular weight polyethylene prepared in accordance with the process of the present disclosure, characterized by having a melt elastic modulus build-up <1.0 MPa, melting temperature (Tm)>135° C. and heat of fusion ($\Delta H$)>130 J/g.

Typically, the easily processable ultrahigh molecular weight polyethylene is melt processed at a temperature of 128° C., which is substantially lower than its melting temperature.

BRIEF DESCRIPTION OF THE ACCOMPANYING DRAWINGS

FIG. 1 illustrates the morphology of:
(A) First Ultrahigh Molecular Weight Polyethylene (i.e. normal or entangled);
(B) Second Ultrahigh Molecular Weight Polyethylene (i.e. disentangled); and
(C) mixed matrix as obtained by melt mixing the first and the second ultrahigh molecular weight polyethylenes in a melt mixer, as shown by the Polaroid Optical Microscopy (POM), in accordance with the process of the present disclosure;

FIG. 2 illustrates melt elastic modulus build-up of mixed matrix obtained by melt mixing the following:

(a) first ultrahigh molecular weight polyethylene (RIL-3) and second ultrahigh molecular polyethylene of molar mass 3.5 M (RIL-1) in the proportion of 70:30% by wt; and (b) first ultrahigh molecular weight polyethylene (RIL-3) and second ultrahigh molecular weight polyethylene of molar mass 5.4 M (RIL-2) in the proportion of 70:30% by wt, in accordance with the process of the present disclosure;

FIG. 5 illustrates melt elastic modulus build-up of compression molded sheets prepared from the:

Figure 6:
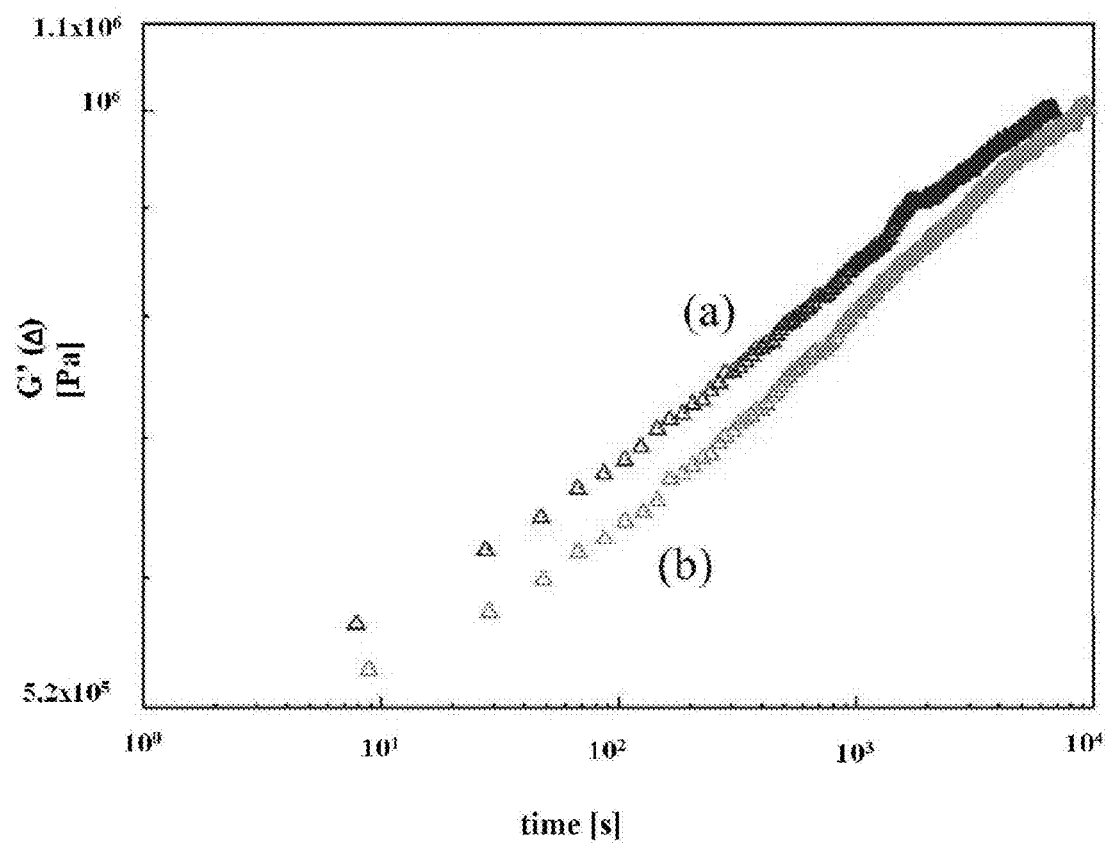
Figure 7A:
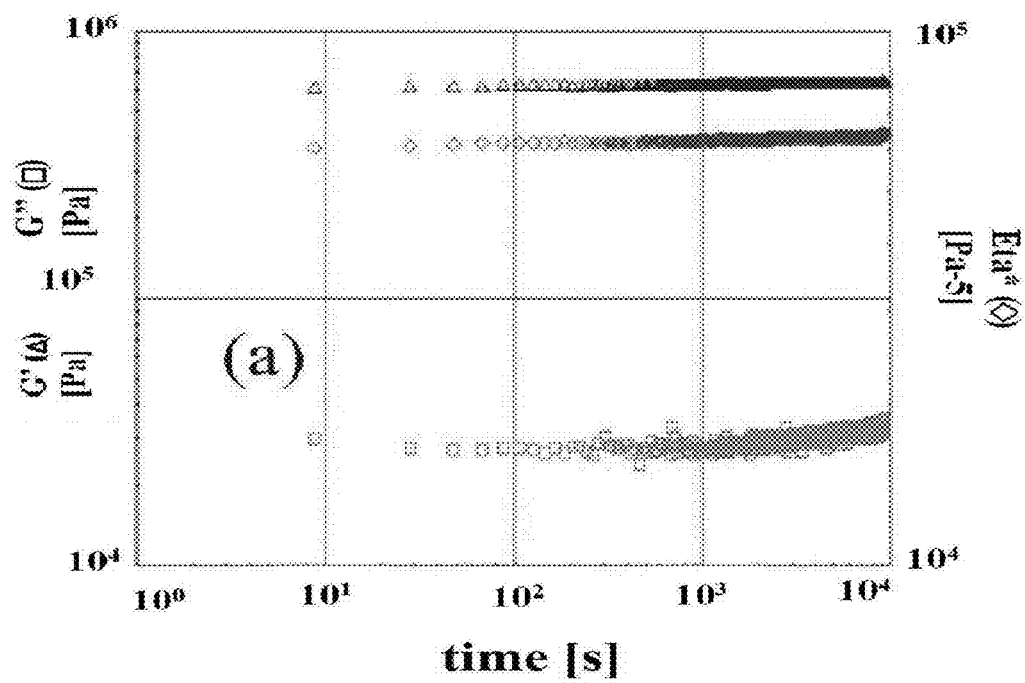
Figure 7B:
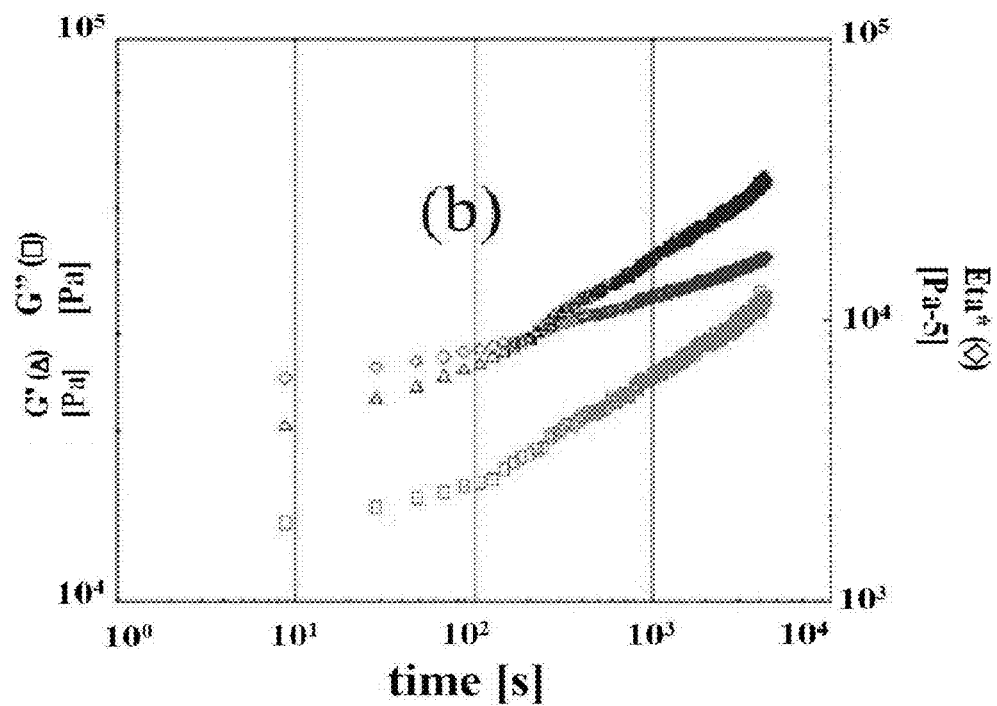
Figure 7C:
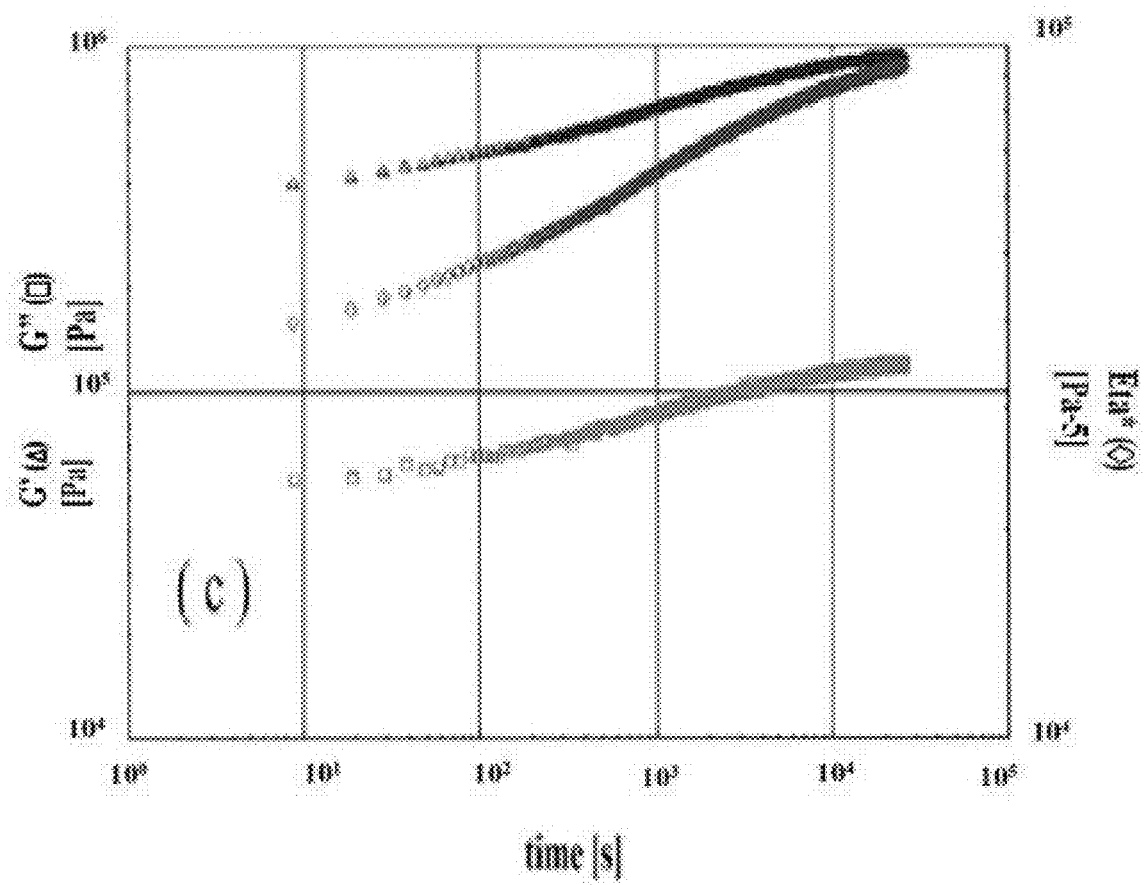

(a) and (b) resultant ultrahigh molecular weight polyethylene matrices wherein the resultant ultrahigh molecular weight polyethylene is obtained by melt mixing the first and the second ultrahigh molecular weight polyethylene in 50:50% w/w (refer to FIG. 5(a) for CMS-1 and FIG. 5(b) for CMS-2), (c) Second ultrahigh molecular polyethylene; and (d) Commercial entangled ultrahigh molecular weight polyethylene (also refer as Ticona in the draft specification, refer to FIG. 5(d)), in accordance with the present disclosure;

FIG. 6 illustrates melt elastic modulus build-up of resultant ultrahigh molecular weight polyethylene matrices on time sweep mode wherein the resultant ultrahigh molecular weight polyethylene matrices are obtained by melt mixing the first ultrahigh molecular weight polyethylene of molar mass 4.0M (RIL-3) individually with (a) a second ultrahigh molecular weight polyethylene of molar mass 3.5 M (RI1-1); and (b) a second ultrahigh molecular weight polyethylene of molar mass 5.4M (RI1-2), in accordance with the present disclosure; and FIG. 7 illustrates Time sweep melt elastic modulus build-up curves for (a) first ultrahigh molecular weight polyethylene (normal or entangled), (b) second ultrahigh molecular weight polyethylene (disentangled), and (c) resultant ultrahigh molecular weight polyethylene obtained by melt mixing the first and the second ultrahigh molecular weight polyethylene, in accordance with the present disclosure.

DETAILED DESCRIPTION

The outstanding properties allied with "Ultrahigh Molecular Weight Polyethylene" makes them ideal for various applications, however the exceptionally high molecular weight and high degree of entanglement across the polymeric chains makes it very difficult to process these polymers. Some of the most widely used accepted methods for improving the process-ability of ultrahigh molecular weight polyethylene, particularly gel spinning involves the use of large amount of solvents like decalin. However, the recovery of a large volume of solvent poses serious economic and environmental concerns.

Accordingly, the inventors of the present disclosure envisage a cost effective and a greener approach for improving the process-ability of ultrahigh molecular weight polyethylene that successfully obviates the disadvantages of prior-art methods allied with the usage of large amount of solvents.

In accordance with one aspect of the present disclosure, there is provided a process for preparing easily processable ultrahigh molecular weight polyethylene. The method for preparing easily processable ultrahigh molecular weight polyethylene in accordance with the present disclosure comprising the melt mixing of a first ultrahigh molecular weight polyethylene and an optimal amount of a second ultrahigh molecular weight polyethylene along with a minimal amount of solvent to obtain a resultant easily processable ultrahigh molecular weight polyethylene.

The first ultrahigh molecular weight polyethylene as employed in the process of the present disclosure is a normal/entangled ultrahigh molecular weight polyethylene possessing poor process-ability. The first ultrahigh molecular weight polyethylene is melt processable only at or above its melting temperature that typically ranges from 132° C. to 145° C. and under high pressure conditions. The melt elastic modulus build-up value>1.0 MPa further confirms the poor process-ability of the first ultrahigh molecular weight polyethylene.

The weight average molecular weight of the first ultrahigh molecular weight polyethylene as employed in the process of the present disclosure is typically higher than $1\times10^5$ g/mol. The preferred weight average molecular weight particularly preferred weight average molecular weight ranges between $2\times10^6$ to $6\times10^6$ g/mol. The amount of the first ultrahigh molecular weight polyethylene typically varies between 66% and 80%.

The second ultrahigh molecular weight polyethylene as employed in the process of the present disclosure is a disentangled ultrahigh molecular weight polyethylene having a weight average molecular weight typically varying between $1.0\times10^6$ and $6\times10^6$ g/mol. The melt elastic modulus build-up value of below 1.0 MPa, preferable <1.0 MPa confirm its highly disentangled nature. The second ultrahigh molecular weight polyethylene as added to the first ultrahigh molecular weight polyethylene along with the optimal amount of solvent in accordance with the process of the present disclosure improves the nucleation in the highly entangled first ultrahigh molecular weight polyethylene and facilitates the formation of the resultant easily processable modified matrix of ultrahigh molecular polyethylene having substantial improved degree of disentanglement as compared to the first ultrahigh molecular weight polyethylene, and hence improved processability.

The preparation of the resultant ultrahigh molecular weight polyethylene having improved processability is predominantly influenced by the concentration of the second ultrahigh molecular weight polyethylene. The amount of the second ultrahigh molecular weight polyethylene typically ranges between 20-60%, preferably between 20-40%, and most preferably between 20-30%, with respect to the weight of the first ultrahigh molecular weight polyethylene.

Typically, the first ultrahigh molecular weight polyethylene is melt-mixed with the second ultrahigh molecular weight polyethylene and the solvent at a temperature ranging between 110-160° C., preferably in the range of 140-150° C., and most preferably in the range of 120-130° C. to obtain a blend. This temperature range is sufficient for melt mixing and for structurally transforming the blend.

The solvent used in accordance with the method of the present disclosure is typically selected from the group of solvents including solvents having high boiling point and solvents having low boiling point. In one of the embodiments, paraffin and decalin are particularly preferred as the high boiling point solvents. In another embodiment, acetone is particularly preferred as the low boiling point solvent.

As compared to the processes known in the art, the amount of the solvent employed in the process of the present disclosure is substantially low. The preferred amount of the solvent is less than 20%, preferably not more than 10%, more preferably not more than 5%, with respect to the mass of the blend. The solvent used in the process acts as a plasticizer/swelling agent and it governs the process of modification. The solvent also plays a critical role in mobilizing the chains of entangled ultrahigh molecular weight polyethylene when it is exposed to appropriate temperature. During compression and molding, the solvent is knocked out. The choice of the solvent may depend on considerations of costs, environmental issues, safety, and other economical or practical concerns. Nonetheless, all species employed as solvents according to the present disclosure exhibit sufficient physico-chemical affinity to the polymer to be absorbed into the material and to cause it to swell. The solvent acts as a supercritical fluid, which permits rapid diffusion into the polymer, and it can be removed from the swollen polymer, for example by reduction of pressure and by flashing it off.

In accordance with one embodiment of the present disclosure, 5-10% acetone, preferably 2-5% acetone and yet more preferably 2-3% acetone containing water in an amount ranging between 1000-2000 ppm, preferably between 400-700 ppm and most preferably between 100-200 ppm is used as the solvent. Because of its lower boiling point as compared to the other solvents, acetone can be removed from the molded product quite easily. On account of this, acetone is particular preferred in the process of the present disclosure wherein the present process is employed for the manufacture of medical grade oriented products. The amount of the residual solvents allowed in the final oriented product in this category is required to be extremely low and the manufacturers are required to adhere to stringent standards as laid down by the Regulatory Authorities.

In addition to the essential ingredients, the process of the present disclosure further comprises the inclusion of various excipients that include antioxidants, lubricants, colorants and the like. Antioxidants protect the polymer from degradation during compression molding. Typically, hindered phenolic and secondary amines are used as primary antioxidants. The suitable and non-limiting examples of primary antioxidants as employed for the purpose of the present disclosure include alkyl phenols, alkylidene-bisphenols, thiobisphenol, hydroxy benzyl compounds, amino phenols and hydroxyphenylpropionates. Among the most widely used antioxidants are Irganox1010 and Irgafos 168. Typically, the concentration of primary antioxidants varies in the range of 0.02% to 1%.

In accordance with one of the embodiments, the process of the present disclosure involves the addition of peroxide during the preparation of the blend in an amount ranging between 500-1000 ppm, more preferably 200-400 and most preferably 50-100 ppm. The addition of peroxide expedites the sintering/fusion process during the compression molding of the blend. Peroxides are extremely sensitive to the environmental conditions. A little change in temperature can lead to their decomposition. As a result, the peroxide employed in accordance with the present disclosure is selected from the linear/cyclic structure molecules with FDA approval. The commercially available peroxides that may be employed include Luperox101, Parkadox241.

The resultant ultrahigh molecular weight polyethylene as obtained in accordance with the process of the present disclosure is further subjected to characterization for evaluating its thermal, rheological and mechanical properties. The evaluated properties thus are also compared with the first and the second ultrahigh molecular weight polyethylene.

Unlike, the first ultrahigh molecular weight polyethylene having poor process-ability, the resultant ultrahigh molecular weight polyethylene prepared in accordance with the process of the present disclosure is easily processable and is suitable for the preparation of various oriented products through solid stretching.

The resultant ultrahigh molecular weight polyethylene prepared in accordance with the present disclosure is characterized by having a weight average molecular weight of at least $1 \times 10^6$ g/mol, preferably $>0.50 \times 10^6$ g/mol, as measure by rheometry and enhanced thermal properties as compared to the first ultrahigh molecular weight polyethylene. The enhanced thermal properties typically include a melting temperature (Tm)>135° C. and heat of fusion>130 J/g. In spite of possessing enhanced thermal properties as compared to the first ultrahigh molecular weight polyethylene, the resultant ultrahigh molecular weight polyethylene is melt processable at a temperature which is substantially lower than its melting temperature. Typically, the resultant ultrahigh molecular weight polyethylene is melt processed at a temperature of 128° C. The melt processing of the resultant ultrahigh molecular weight polyethylene substantially below its melting temperature clearly indicates towards its improved process-ability as compared to the process-ability of the first ultrahigh molecular weight polyethylene. Further, the melt elastic modulus build-up value of below 1.0 MPa, preferably <1.0 MPa also confirms the improved process-ability of the resultant ultrahigh molecular weight polyethylene as compared to the first ultrahigh molecular weight polyethylene.

To further evaluate the improved processability of the resultant ultrahigh molecular weight polyethylene, both the resultant and the first ultrahigh molecular weight polyethylenes are melt processed by using compression molding technique under optimum pressure, temperature and time protocol. The resultant ultrahigh molecular weight polyethylene is melt processable at a temperature substantially below its melting temperature whereas the first ultrahigh molecular weight polyethylene is melt processable at its melting temperature or above. Further to the low melt processing temperature, the resultant ultrahigh molecular weight polyethylene requires lesser compression molding time as compared to the first ultrahigh molecular weight polyethylene.

The molded part formed from the compression molding of the resultant ultrahigh molecular weight polyethylene is still highly draw-able below its melting point, which indicates that, even though the resultant ultrahigh molecular weight polyethylene under the specified optimum conditions is melt processed, it still has a low entanglement density. The resultant ultrahigh molecular weight polyethylene prepared in accordance with the process of the present disclosure also possesses excellent fusion and sintering abilities. The sintering process is quite effective in temperatures ranging between 90-140° C., preferably 110-130° C., most preferably 120-128° C., under pressure ranging between 50-400 kg, preferably 50-350 and most preferably 50-300 kg. The time cycle for compression molding process is typically maintained between 4 and 8 hrs, preferably between 4 and 6 hrs, most preferably between 3 and 4 hr.

Even though a major part of the starting material of the process is entangled ultrahigh molecular weight polyethylene (it constitutes 65%, preferably more than 70% and still preferably more than 80% of the total starting material), the resulting modified product is a single entity of disentangled ultrahigh molecular weight polyethylene i.e. the resultant ultrahigh molecular weight polyethylene with excellent fusion and sintering.

The storage modulus as well as the melt viscosity of the resultant ultrahigh molecular weight polyethylene of the present disclosure is relatively lower in comparison to the respective values for entangled ultrahigh molecular weight polyethylene. Storage modulus of the resultant ultrahigh molecular weight polyethylene of the present disclosure is lower than 6000 Pa while its melt viscosity is typically lower than 60000 Pa-S.

One of the parameters for evaluating the process-ability of the resultant ultrahigh molecular weight polyethylene is its stretch ability. It has been found that the stretch-ability of a compressed sheet of the resultant ultrahigh molecular weight polyethylene prepared in accordance with the present disclosure using acetone as the solvent at 133° C. is about 30 times of the original length subjected to stretching at said temperature. The stretching speed varies depending on the manner of stretching and the molecular weight and composition of the polymer, and it can be determined suitably.

In case of batch-wise stretching, the stretching speed is usually in the range of 1-600 mm/min, preferably 1-300 mm/min, more preferably 5-50 mm/min. In the case of continuous stretching, the stretching speed is usually in the range of 0.1-500 m/min, preferably 1-200 m/min, more preferably 10-200 m/min. From an economic point of view, setting a high stretching speed is preferred. It is desirable to increase the draw ratio as much as possible, because a higher draw ratio results in higher strength and tensile modulus.

The resultant ultrahigh molecular weight polyethylene prepared in accordance with the present disclosure is useful for making oriented products namely tape, fiber, film etc. via sintering/compression process with significantly reduced time cycles under a unique combination of pressure and temperature protocol.

In accordance with another aspect of the present disclosure, there is provided a process for manufacturing an oriented product using the resultant ultrahigh molecular weight polyethylene of the present disclosure. The present inventors have surprisingly found out unique advantages associated with the use of the resultant ultrahigh molecular weight polyethylene of the present disclosure as the starting material during the manufacture of an oriented product. It has been found that in the process for manufacturing an oriented product in accordance with present disclosure, the method step of annealing is obviated. This is because of the fact that the process of the present disclosure maintains the polymer in a disentangled thermodynamically metastable melt form for a sufficiently large time, which in turn improves the process-ability of the material.

The time during which the entanglement increases, resulting in a build-up of the storage plateau modulus G* to a final value of around 2.0 MPa (which is indicative for a highly entangled ultrahigh molecular weight polyethylene), is in most cases dependent on the heating rate (THETA) of the polymer. When a dependence is observed, the build-up time increases with a decreasing .THETA.. If an extended processing time window is required, it is preferred that .THETA. is at most 5 K/minute; even more preferred is at the most 1K/minute.

Also the starting value of G* is of importance. The lower the G* of the first ultrahigh molecular weight polyethylene, the longer it takes to achieve the G*=2.0 MPa value. Therefore it is preferred that the initial value of the G* of the first ultrahigh molecular weight polyethylene is at the most 0.75 MPa. For a given polymerization with a specific catalyst system, the resulting G* starting value is typically lower with a lower polymerization temperature. Although from the mechanical properties point of view, the desired G* end-value is 2.0 (fully entangled material), for processing the first ultrahigh molecular weight polyethylene the G* must be below 1.5 MPa, more preferably below 1.2 MPa.

The G* build-up time can be extended or reduced by the polymerization temperature and/or processing heating rate. In fact, the slower the build-up of G* value during shaping, the better it is for the process-ability of the first ultrahigh molecular weight polyethylene, as it retards the increase in entanglement. Therefore it is preferred that the speed (v) at which G* builds up during shaping, is less than 3 MPa/hour, more preferred is even less than 0.5 MPa/hour.

After shaping, the value of the then achieved G* is raised to its final value of around 2.0 MPa. The speed at which this is done can be as high as the situation allows. This can be achieved by increasing the heating rate. The final temperature should preferably not exceed 450 K.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Example-1

The first ultrahigh molecular weight polyethylene (hereinafter refer as first UHMWPE) having high degree of entanglement and a second ultrahigh molecular weight polyethylene (hereinafter refer as second UHMWPE) of different molecular weights having high degree of disentanglement were used for making a resultant easily processable ultrahigh molecular weight polyethylene (hereinafter refer as resultant UHMWPE). In addition to above described ultrahigh molecular weight polyethylenes, an optimum amount of decalin along with excipients like an antioxidant (Irganox1010) to prevent degradation at melt modification stage was used.

The resultant ultrahigh molecular weight polyethylene obtained in accordance with the process of example-1 was further subjected to characterization for evaluating its thermal, rheological and mechanical properties. The evaluated properties were also compared with the corresponding properties of the first and the second ultrahigh molecular weight polyethylene.

Melt rheological analysis was carried out by using Rheometrics Dynamic Analyser (RDA-III) from T A instruments to study the modulus built up in time sweep mode using 8 mm diameter parallel plate geometry. The analysis conditions were maintained as follows: temperatures: 160° C. and 180° C., strain: 0.5%, frequency: 10 rad/s. 0.7 to 1 mm thick compression moulded polymer sheets were used for the analysis. The melt elastic modulus build-up in frequency sweep mode was also measured by using 8 mm parallel plate geometry in different isothermal conditions (160-200° C.). Using TTS method, master plots were obtained to calculate the molecular weight and molecular weight distribution of the polymer by employing Orchestrator software. Melting temperature ($T_m$) of the resultant UHMWPE was measured by using Differential Scanning Calorimetry (DSC). The polymer samples having size 5 mg were analyzed on DSC 2910/Q2000 MDSC (M/s. TA instruments, USA) by heating them from ambient to 250° C. in $N_2$ atmosphere with a heating rate of 10° C./min. Molecular weights (MW) and thermal characteristics of the first, second and resultant UHMWPE are summarized in Table-1. Ticona as a commercial reference sample was also used.

TABLE 1

Molecular weights & thermal characteristics of the first and second ultrahigh molecular weight polyethylenes.

| UHMWPE Polymers | MW- Million Dalton | BD (g/cc) | Crystallinity (%) (DSC ΔH value) | Melting endotherm Tm$_1$ ° C. | ΔH-Tm$_1$ (J/g) |
|---|---|---|---|---|---|
| RIL-1 | 3.50 | 0.08 | 67.23 | 143 | 197 |
| RIL-2 | 5.40 | 0.07 | 63.13 | 143 | 185 |
| RIL-4 | 6.45 | 0.09 | 64.50 | 145 | 192 |
| RIL-3 | 4.00 | 0.41 | 47.85 | 142 | 140 |
| Ticona | 4.10 | 0.42 | 47.60 | 134 | 139 |

RIL-1, RIL-2 and RIL-4: Second UHMWPE (Lab synthesized);
RIL-3: First UHMWPE (Lab Synthesized); and
Ticona: Commercialultrahigh molecular weight polyethylene.

Two different 5 g batch formulations were prepared by mixing the first UHMWPE (4 Million Dalton) and the second UHMWPE in the weight proportion of 70:30, in the presence of 10% decalin and 0.25% Irganox1010. In the first batch, the second UHMWPE of 3.5 Million Dalton molar mass (i.e. R1) was employed whereas in the second batch, the second UHMWPE of 5.4 Million Dalton (i.e. R2) molar mass was employed. The obtained formulations were then melt mixed at 120° C. under 25 rpm for 30 minutes to obtain resultant polymer matrices of easily processable ultrahigh molecular weight polyethylene. In both formulations, the resultant products converted to fibrous material but here a first batch finding was further discussed. In case of first batch, wherein the first UHMWPE of 4 Million Dalton molar mass and the second UHMWPE of molar mass 3.5 Million Dalton was employed, the whole mass was found to be converted in to a fibrous material as shown in Polarizing Optical Microscopy photograph (refer to FIG. 1(c) of the accompanying drawings). The nature of disentanglement in the resultant easily processable polymer matrix of UHMWPE was further confirmed from its melt elastic build up values as shown in FIG. 2 of the accompanying drawings.

A comparison of the typical blend of the first UHMWPE and the second UHMWPE in the proportion of 70:30 by weight with calcium stearate and a known gel spinning composition is shown in Table-2.

TABLE 2

Comparison of gel & solid stretching composition

| | Typical composition | | | |
|---|---|---|---|---|
| Approaches | Polymer (g) | Decaline (g) | Cast in (ppm) | Remark |
| Gel stretching (Gel spinning) | 1.0 | 100 | nil | Stretchable to many folds |
| Solid stretching (Dry Spinning) | 1.0 | 0.05-0.15 | 250-300 | Eco-friendly, solid stretchable of mixed matrix |

Similarly, individual polymers i.e. the first UHMWPE and the second UHMWPE were melt mixed separately under the same process conditions as described above. The corresponding resultant polymer matrices thus obtained were examined using Polaroid Optical Microscopy. The polymer matrix obtained from the melt mixing of the first UHMWPE was not found to be transformed into the fibrous form (refer to FIG. 1(a) of the accompanying drawings) whereas the polymer matrix obtained from the melt mixing of the second UHMWPE was found to be easily converted into the fibrous material (refer to FIG. 1(b) of the accompanying drawings).

Figure 1:
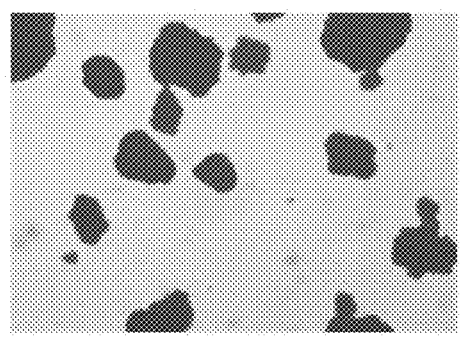
Figure 1:
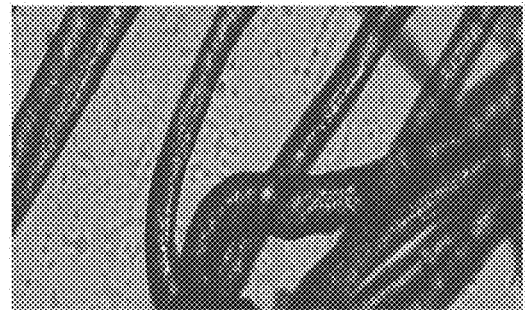
Figure 1:
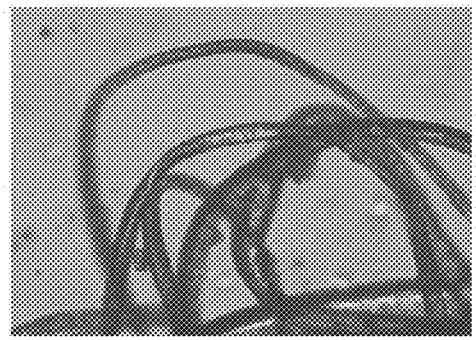
Figure 2:
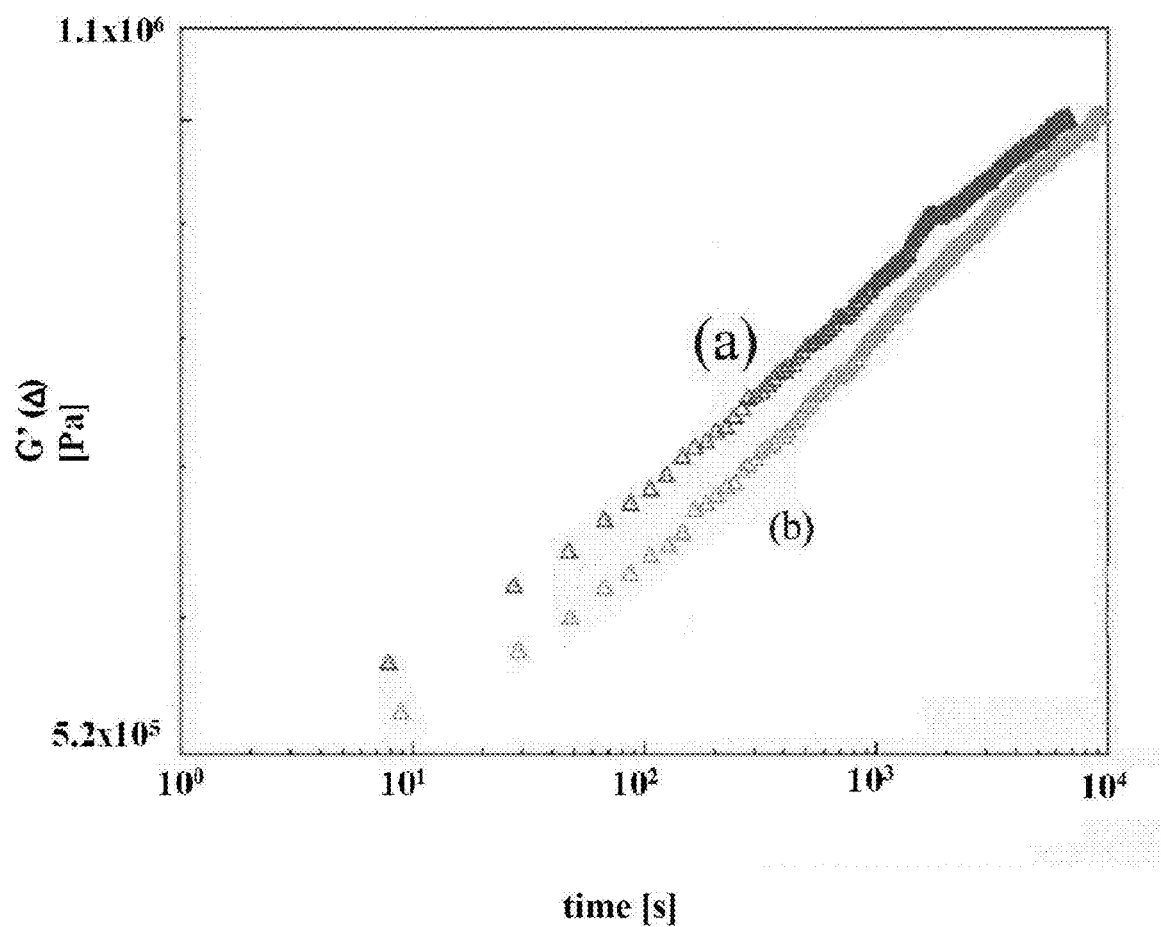

The POM photograph distinctly differentiates the morphology between the first, second and the resultant ultrahigh molecular weight polyethylene as obtained in accordance with the process of example-1 (refer to FIG. 1 of the accompanying drawings).

Figure 3:
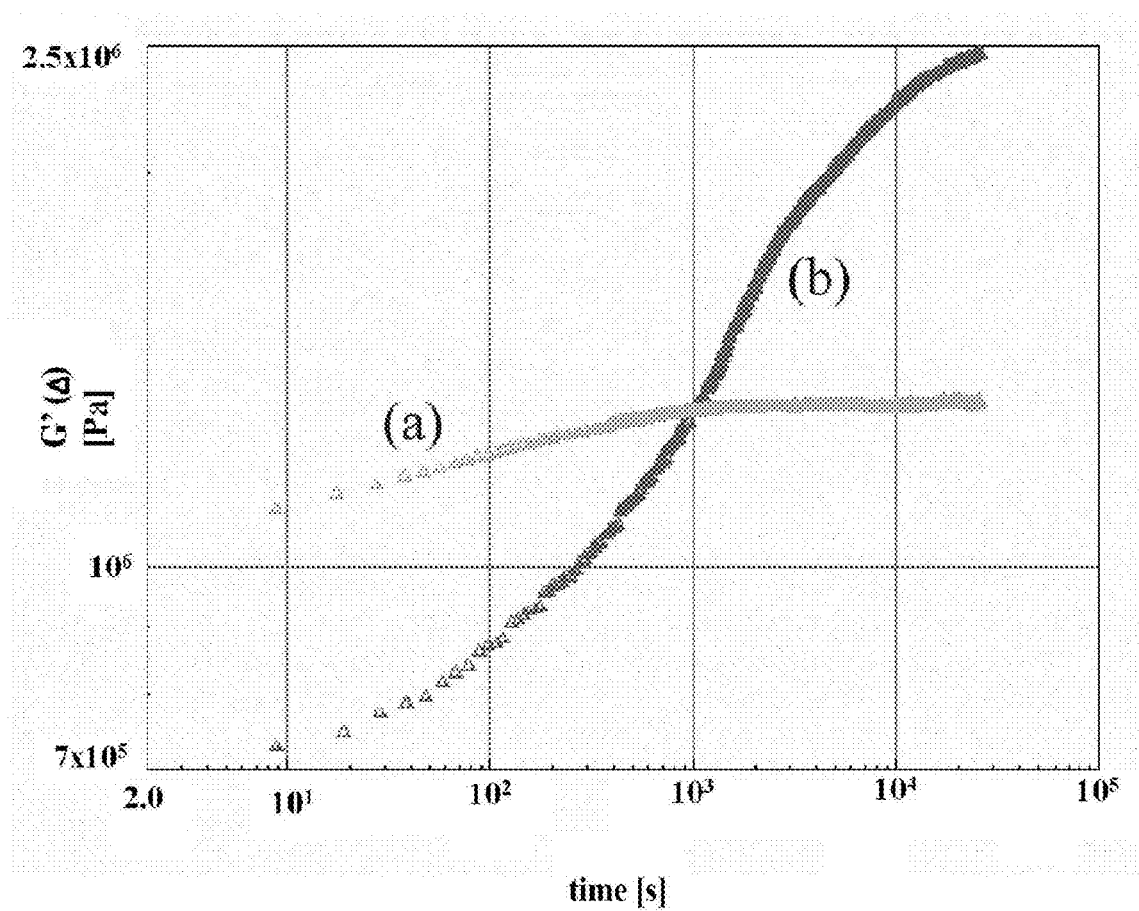
FIG. 3 illustrates the comparison of melt elastic modulus (G') build-up of: (a) first ultrahigh molecular weight polyethylene having molar mass 4.0 M (Lab polymer) and (b) second ultrahigh molecular weight polyethylene of molar mass 3.9 M (Lab Polymer), in accordance with the process of the present disclosure.
Figure 4:
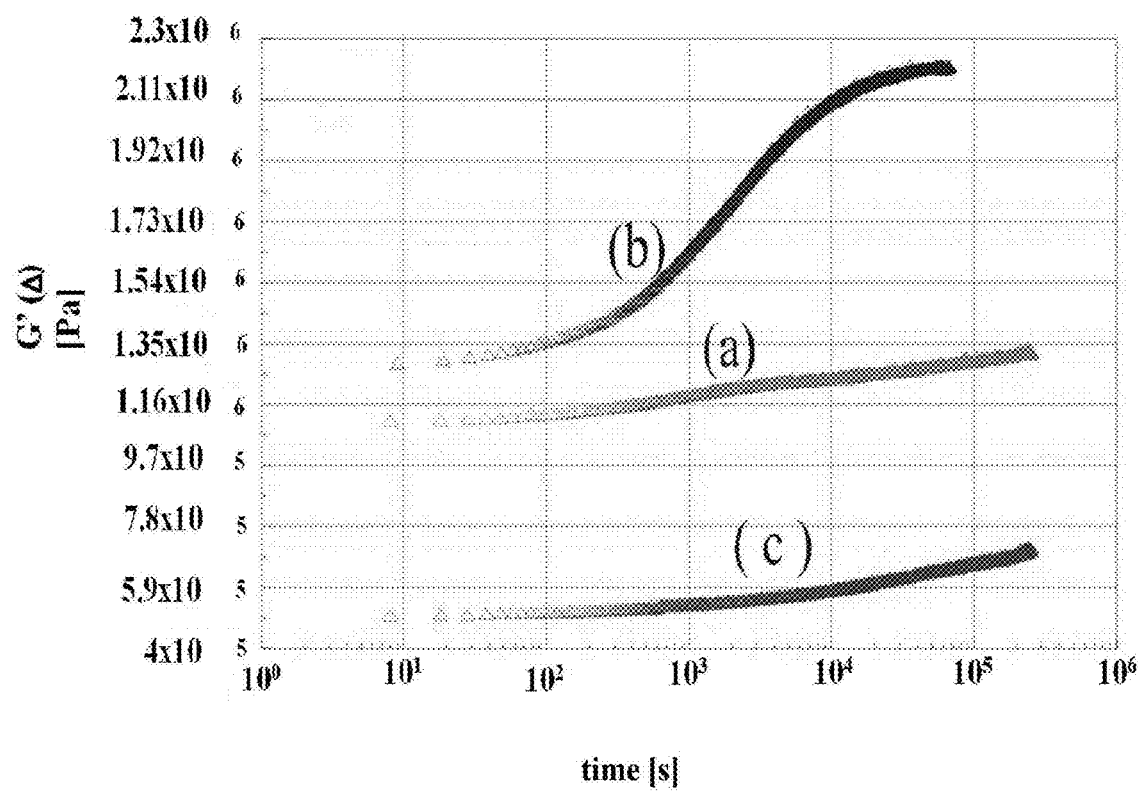
FIG. 4 illustrates melt elastic modulus build-up of second ultrahigh molecular weight polyethylene having (a) molar mass of 5.4 M (RIL-2), (b) molar mass of 3.5 M (RIL-1) and (c) molar mass of 6.45M (RIL-4), in accordance with the present disclosure.

Furthermore, a comparison of the Elastic Modulus (G') build-up between second UHMWPE (MW 3.90 Million Dalton) and first UHMWPE (4 Million Dalton) is shown in FIG. 3 of the accompanying drawings. It was observed that unlike the resultant easily processable ultrahigh molecular weight polyethylene as obtained in accordance with the process of example-1, no elasticity build-up for the first UHMWPE was observed. In addition, the elastic build-up characteristics of the second UHMWPE of different molar mass (i.e. RIL-1: 3.5 Million Dalton; RIL-2: 5.4 Million Dalton; and RIL-4: −6.45 Million Dalton), as shown in FIG. 4 of the accompanying drawings, also confirmed the similar disentanglement characteristics of the resultant ultrahigh molecular weight polyethylene.

Further, the polymer matrices derived separately from the first UHMWPE, second UHMWPE and from the blend of the first and second UHMWPEs were further used to prepare compression molded sheets (CMS). The compression molded sheets were prepared under optimum pressure, temperature, and time protocol. The various process conditions are summarized in Table-3. The obtained compression molded sheets were then characterized for their rheological and thermal properties, as described in Table-4.

TABLE 3

Compression molding process conditions for making ultrahigh molecular weight polyethylene sheets.

| Samples (Single and Mixed) | No's of cycles | Temperature (0° C.) | Pressure (kg) | Time (minutes) |
|---|---|---|---|---|
| RIL-1 | 1st | 128 | 65 | 10 |
| | 2nd | 128 | 220 | 30 |
| RIL-2 | 1st | 128 | 65 | 10 |
| | 2nd | 128 | 220 | 30 |
| RIL-3 | 1st | 140 | 250 | 10 |
| Ticona | 1st | 140 | 250 | 10 |
| RIL-3 + RIL-1 | 1st | 128 | 65 | 10 |
| | 2nd | 128 | 220 | 30 |
| RIL-3 + RIL-2 | 1st | 128 | 65 | 10 |
| | 2nd | 128 | 220 | 30 |

RIL-1 and RIL-2: Second UHMWPE;
RIL-3: First UHMWPE;
RIL-3 + RIL-1 and RIL-3 + RIL-2: resultant UHMWPE
Batch Size: 5 g; Decaline: 10%; Parkadox: 100 ppm; Irganox -1010: 0.25%, Cast: 250 ppm

TABLE 4

Thermal characteristics of compression molded sheets.

| UHMWPE | MW-Millions Dalton | DSC, (° C.) Tm₁ | Tm₂ | Tc | DSC, (J/g) ΔH-Tm₁ | ΔH-Tm₂ | Morphology before melt mixing | Morphology after melt mixing/C-Mold |
|---|---|---|---|---|---|---|---|---|
| RIL-1 | 3.50 | 148 | 135 | 117 | 190 | 132 | fluppy | Fibrous/Sheet |
| RIL-2 | 5.4 | 147 | 134 | 116 | 189 | 122 | fluppy | Fibrous/sheet |
| RIL-3 | 4.0 | 133 | 133 | 112 | 138 | 141 | powder | powder/sheet |
| RIL-3 + RIL-1 | 4 + 3.5 | 149 | 137 | 118 | 190 | 124 | Fluppy & powder | Fibrous/sheet |
| RIL-3 + RIL-2 | 4 + 5.4 | 148 | 136 | 117 | 187 | 123 | fluppy powder | Fibrous/sheet |
| Ticona | 4.10 | 137 | 136 | 118 | 139 | 137 | powder | Powder/Sheet |

Batch Size: 5 g; Decaline: 10%; Parkadox100 ppm; Irganox -1010: 0.25%, Cast: 250 ppm A comparison of Tm, Tc and the corresponding heat of enthalpies (ΔH(J/g)) for the compression molded sheets of the first, second and the resultant UHMWPE as measured by DSC are shown in Table-4. It is evidenced from the data as illustrated in Table-4, that the second UHMWPE both in single & mixed modified state exhibited high melting temperatures (147/149° C.) and heat of melting (180-210 J/g).

The melt elastic modulus build up as well as the low bulk density, and the distinct thermal and rheological characteristics as shown in Tables-1, 3 and 4 confirmed the disentangled nature of the resultant UHMWPE. The amount of decalin required for the modification of the first UHMWPE was markedly lower as compared to the amount required for a typical gel spinning composition (Table-2).

Example-2

A 5 g batch of the blend containing the first UHMWPE (2.5 Million Dalton) and the second UHMWPE (5.7 Million Dalton) in the weight proportion of 50:50 by wt was prepared. To this blend, 5% decalin containing 100 ppm Parkadox24 and 0.25% Irganox-1010 was also added to obtain a mixture. The obtained mixture was then melt mixed under similar process conditions as described in example-1 to obtain the resultant easily processable UHMWPE. The resultant UH-MWPE was compression molded into sheets. The compression molded sheets of the second UHMWPE and Ticona polymers, as reference samples, were also prepared under optimum process condition as illustrated in Table-5. The Compression molded sheets were characterized for melt rheology on time sweep mode and thermal mode by DSC to confirm the conversion of the first UHMWPE into the resultant easily processable ultrahigh molecular weight polyethylene due to a significant reduction in entanglement after modification.

Figure 5:
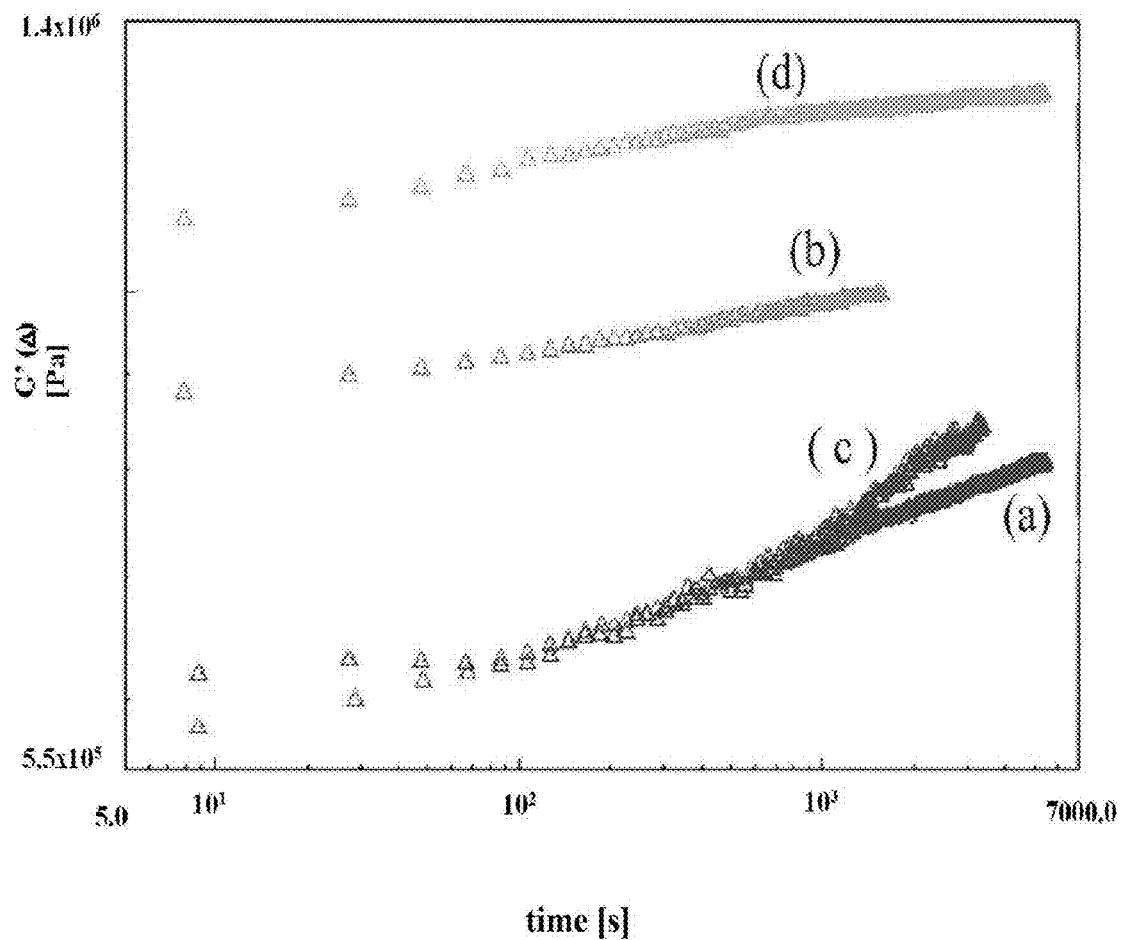

Rheological characteristics showed melt elastic modulus build up characteristics followed by a rise in Tm, TC & heat of enthalpy. This is shown in FIG. 5 of the accompanying which is based on Table 5.

TABLE 5

Thermal properties of compression molded sheets under different process conditions.

| Samples | First UHMWPE + Second UHMWPE (wt %) | Tm₁ ° C. | ΔH-Tm₁ J/g | Tm₂ ° C. | ΔH-Tm₂ J/g | Tc ° C. | ΔH-Tc J/g | Compression molding Condition |
|---|---|---|---|---|---|---|---|---|
| CMS-1 | 50:50 | 149 | 191 | 139 | 115 | 118 | 92 | Cycle-1: 128° C./60 kg; 10 min; Cycle-2: 128° C./170 kg, 50 min |
| CMS-2 | 50:50 | 137 | 122 | 131 | 125 | 118 | 88 | Single shot: 138° C./350 kg; 10 min |
| CMS-3 | Nil:100 | 150 | 183 | 139 | 97 | 116 | 75 | Cycle-1: 128° C./60 kg; 10 min; Cycle-2: 128° C./170 kg, 50 min |
| CMS-4 | Ticona | 139 | 137 | 133 | 127 | 117 | 82 | Single shot: 138° C./350 kg; 10 min |

CMS: Compression Molded Sheets
Batch Size: 5 g; Decaline: 5%; Irganox1010: 0.25%; Cast: 250 ppm.

TABLE 6

Rheological Characteristics of compression molded sheets of ultrahigh molecular weight polyethylenes.

| Sample | First UHMWPE + Second UHMWPE (wt %) | Storage modulus G' (Pa) × 10⁵ | Loss modulus G" (Pa) | tan delta | Viscosity (Pa-S) |
|---|---|---|---|---|---|
| CMS-1 | 50:50 | 6.19 | 28425 | 0.0459 | 61994 |
| CMS-2 | 50:50 | 5.8 | 1.21 × 10⁵ | 0.20871 | 59315 |
| CMS-3 | Nil:100 | 8.83 | 1.63 × 10⁵ | 0.18459 | 89831 |
| CMS-4 | Ticona | 10.9 | 2.215 × 10⁵ | 0.20208 | 1.118 × 10⁵ |

Batch Size: 5 g; Decaline: 5%; Irganox1010: 0.25%; and Cast: 250 ppm.

Table 6 provides the comparative melt rheological characteristics of the first, second and the resultant ultrahigh molecular weight polyethylene. These results provide further evidence of the conversion of the blend of the first UHMWPE and the second UHMWPE into a single entity of the resultant ultrahigh molecular weight polyethylene having lower values of storage modulus (G'; Pa) and melt viscosity (η; Pa-S) as compared to the first ultrahigh molecular weight polyethylene (reference sample Ticona).

Example-3

In this example, a blend of the first ultrahigh molecular weight polyethylene (2.7 Million Dalton) and the second UHMWPE (3.9 Million Dalton) in the ratio 80:20 by wt was compression molded under the given conditions summarized below in Table-7. The compression molded sheets were characterized for thermal characteristics by DSC. It was found when compression condition was changed for Sheet-B, it showed lower Tm as compared to the second UHMWPE and the resultant UHMWPE as shown in Table-7.

TABLE 7

Thermal characteristics of compression molded sheets.

| Sample | $Tm_1$ °C. | $\Delta H\text{-}Tm_1$, J/g | $Tm_2$ °C. | $\Delta H\text{-}Tm_2$, J/g | Tc °C. | $\Delta H\text{-}Tc$, J/g |
|---|---|---|---|---|---|---|
| CMS-A | 149 | 191 | 139 | 115 | 118 | 92 |
| CMS-B | 137 | 122 | 131 | 125 | 118 | 88 |
| CMS-C | 150 | 183 | 139 | 97 | 116 | 75 |

CMS-A: Second UHMWPE + first UHMWPE: 60 kg/10 min; 170 kg/50 min at 128° C.
CMS-B: Second UHMWPE + first UHMWPE: 300-350 kg/10 min; Single shot at 138° C.
CMS-C: Second UHMWPE: 60 kg/10 min; 170 kg/50 min at 128° C.

Example-4

The first and the second UHMWPE having similar composition as mentioned in Example-1 were used to prepare compression molded sheets using 5% decalin in the presence of 250 ppm cast under similar compression condition, with and without stabilizer. The resultant UHMWPE was compression molded under optimum condition as mentioned below. The resultant easily process-able ultrahigh molecular polyethylene showed characteristics similar to the second UHMWPE both with & without the stabilizer as evidenced by melt elastic modulus build-up and higher Tm (refer to Table-8 and FIG. 6 of the accompanying drawings).

TABLE 8

Thermal characteristics of compression molded sheets

| Samples | $T_{m1}$ °C. | $\Delta H\text{-}Tm_1$ J/g | $Tm_2$ °C. | $\Delta H\text{-}Tm_2$ J/g | Tc °C. | $\Delta H\text{-}Tc$ J/g |
|---|---|---|---|---|---|---|
| CMS-5A | 149 | 190 | 138 | 116 | 117 | 90 |
| CMS-5B | 150 | 191 | 140 | 115 | 118 | 89 |
| CMS-DUHMWPE | 150 | 183 | 139 | 97 | 116 | 75 |

Batch: 5 g; First UHMWPE: Second UHMWPE- 70:30% by wt; Decaline: 0.500 g; Irganox-1010: 0.25%.
CMS-5A: Compression molded sheet of the resultant UHMWPE (With stabilizer): 65 kg Pr/10 min. 220 kg Pr/30 min at 128° C.; Irganox1010: 0.25%
CMS-5B: compression molded sheet of the resultant UHMWPE (without stabilizer): 65 kg Pr/10 min. 220 kg Pr/30 min at 128° C.
CMS-DUHMWPE: Compression molded sheet (CMS) of the second UHMWPE.

Example-5

A blend of the first UHMWPE and the second UHMWPE having the same MW, as described in Example-3, were compressed molded in 3% acetone under conditions as shown in Table-9. Rheological plots are shown in FIG. 7 of the accompanying drawings. These blends also showed disentangled characteristics as evidenced by melt rheological and thermal characteristics (refer to Table-9 and FIG. 7 of the accompanying drawings, respectively). Acetone was also quite effective similar to decalin, which showed a sharp rise in the melt elasticity for the resultant UHMWPE and the second UHMWPE.

TABLE 9

Compression molded condition & thermal characteristics.

| Compression molded UHMWPE samples | Composition by percentage | DSC: Tm °C. | $\Delta H\text{-}Tm$ J/g | Compression molding Condition |
|---|---|---|---|---|
| First UHMWPE | 100 | 132 | 128 | 145° C./350 kg & 25 min; excellent fusion |
| Second UHMWPE | 100 | 147 | 182 | 130° C./350 kg & 25 min; excellent fusion |
| Resultant - UHMWPE | 80:20 by wt | 149 | 183 | 130° C./350 kg & 25 min; excellent fusion |

The conversion of the blend containing the first and the second UHMWPE in to the resultant UHMWPE showed elastic build-up that was similar to the one shown by the reactor grade second UHMWPE whereas the first UHMWPE did not show such rising pattern (refer to FIG. 7 of the accompanying drawings). The thermal characteristics evaluated by DSC showed that both Tm and heat of enthalpy for the resultant UHMWPE were much higher as compared to the Tm and heat of enthalpy for the first UHMWPE.

Example-6

A blend of 5 g batch of the first UHMWPE (4 Million Dalton) and the second UHMWPE (4.6 Million Dalton) having a composition 50:50 were used for making a resultant UHMWPE using 10% decalin and 0.25% Irganox-1010. Compression molded sheets were prepared under optimum condition for the resultant UHMWPE and separately for the first and the second UHMWPE as reference samples. Thermal characteristics confirmed the conversion of the blend into the resultant UHMWPE which showed elastic build-up properties when the sample was run in time sweep mode. The results are shown in Table-10.

TABLE 10

Thermal characteristics of compressed molded sheets under different Compression molded conditions:

| Compressed molded UHMWPE samples | Composition by percentage | DSC: Tm 0 C. | Tc °C. | $\Delta H\text{-}Tm$ J/g | Compression molding Condition |
|---|---|---|---|---|---|
| First UHMWPE | 100 | 132 | 115 | 128 | 145° C./350 kg & 25 min; excellent fusion |
| Second UHMWPE | 100 | 152 | 117 | 182 | 130° C./350 kg & 45 min; excellent fusion |
| Resultant UHMWPE | 50:50 by wt | 151 | 118 | 183 | 130° C./350 kg & 45 min; excellent fusion |

Example-7

Compression molded sheets of an optimum composition of the first UHMWPE (4 Million Dalton) and the second UHMWPE (4.5 Million Dalton) (65:35 by wt) were prepared under different compression conditions using 3.5% decalin and 0.25% Irganox-1010. Results were summarized in Table-11. Both, the thermal and the melt rheological characteristics confirmed the formation of the resultant UHMWPE after solid modification of the blend which is suitable for making tape or other high tenacity oriented products.

TABLE 11

Thermal characteristics of compression molded sheets under different compression molded condition.

| UHMWPE-CMS samples | Composition by percentage | DSC: Tm 0 C. | Tc 0 C. | ΔH- Tc J/g | Compression molding Condition |
|---|---|---|---|---|---|
| First UHMWPE | 100 | 132 | 115 | 128 | 145° C./250 kg & 25 min; excellent fusion |
| Second UHMWPE | 100 | 152 | 117 | 182 | 129° C./90 kg for 2 min in 1$^{st}$ cycle; 129° C./325 kg for 15 min; excellent fusion |
| Resultant UHMWPE | 65:35 by wt | 151 | 118 | 183 | 129° C./90 kg & 2 min in 1$^{st}$ cycle; 129/325 kg for 15 min; excellent fusion |

CMS: Compression Molded Sheets

Example-8

Compression molded sheets of an optimum composition of the first UHMWPE (4 Million Dalton) and the second UHMWPE 4.5 Million Dalton (75:25 by wt) of 5 g batch were prepared under different compression condition containing 3.5% decalin and 0.25% Irganox-1010. Results were summarized in Table-12. Both thermal and melt rheological characteristics confirmed the formation of resultant UHMWPE having high degree of disentanglement after solid modification of the blend.

TABLE 12

Thermal characteristics of compressed molded sheets under different Compression molded condition.

| UHMWPE-CMS samples | Composition by percentage | DSC: Tm ° C. | Tc ° C. | ΔH- Tc J/K | Compression molding Condition |
|---|---|---|---|---|---|
| First UHMWPE | 100 | 132 | 115 | 128 | 145° C./250 kg & 25 min; excellent fusion |
| Second UHMWPE | 100 | 152 | 117 | 182 | 128° C./350 kg & 10 min in 1$^{st}$ cycle; 135/350 kg for 10 min 2$^{nd}$ cycle; excellent fusion |
| Resultant UHMWPE | 75:25 by wt | 146 | 118 | 180 | 128° 0 C./350 kg & 10 min in 1$^{st}$ cycle; 135/350 kg for 10 mint 2$^{nd}$ cycle; excellent fusion |

Comparative Example

A 5 g batch formulation was prepared by mixing the first UHMWPE (4 Million Dalton) and the second UHMWPE (3.5 Million Dalton) in the weight proportion of 70:30 using 10% decalin and 0.25% Irganox1010 respectively. The whole composition was mixed thoroughly at ambient temperature and then pre analysis was carried out for thermal, bulk density and morphology of the perfectly mixed material.

The polymer mixture was further subjected to melt mixing under optimum temperature of 120° C. and rpm of 25 for 30 minutes to obtain a resultant easily processable polymer matrix of ultrahigh molecular weight polyethylene. The resultant polymer matrix of ultrahigh molecular weight polyethylene was also characterized. The thermal and morphological characteristics clearly differentiates between the polymer mixture as obtained by mixing the first and the second UHMWPE at ambient temperature and the polymer matrix as obtained after melt-mixing the first and the second UHMWPE, as evidenced from the results summarized in Table-13. Thermal characteristics also provide evidence of the significant reduction in entanglement of the polymer matrix and hence easily processable polymer matrix.

TABLE 13

Thermal and Morphological characteristics of mixed matrix before & after melt mixing.

| Samples Status | UHMWPE-I % by wt | UHMWPE-II % by wt | DSC Tm ° C. | ΔH-Tm J/g | Bulk Density | Morphology |
|---|---|---|---|---|---|---|
| Before Melt Mixing | 70 | 30 | 119 | 89 | 0.37 | Powder/Non fibrous |
| After Melt Mixing | 70 | 30 | 148 | 182 | 0.28 | Fibrous |

Batch Size: 5 g; Decaline: 10%; Parkadox100 ppm; Irganox -1010: 0.25%, Cast: 250 ppm

TECHNICAL ADVANTAGES

The present disclosure related to a process for preparing easily processable ultrahigh molecular weight polyethylene, has the following technical advantages:
(1) Use of substantially lower amount of solvent,
(2) Use of an optimal amount of the disentangled ultrahigh molecular weight polyethylene additive to improve the process-ability of entangled ultrahigh molecular weight polyethylene, and
(3) Better thermal behavior of the resultant ultrahigh molecular weight polyethylene compared to the entangled ultrahigh molecular weight polyethylene.

The numerical values mentioned for the various physical parameters, dimensions or quantities are only approximations and it is envisaged that the values higher/lower than the numerical values assigned to the parameters, dimensions or quantities fall within the scope of the invention, unless there is a statement in the specification specific to the contrary The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method of preparing easily processable ultrahigh molecular weight polyethylene, said method comprising the step of adding to a first ultrahigh molecular weight polyethylene having an weight average molecular weight higher than $1\times10^5$ g/mol and a melt elastic modulus build-up >1.0 MPa, a second ultrahigh molecular polyethylene in an amount ranging between 20% to 60% having an weight average molecular weight of at least $2\times10^6$ g/mol and a melt elastic modulus build-up of below 1.0 MPa and a solvent in a weight proportion of less than 20% by weight of the total polymer to obtain a mixture; and stressing the mixture by melt mixing the same to obtain a resultant easily processable ultrahigh molecular weight polyethylene characterized by having a melt elastic modulus build-up <1.0 MPa, enhanced thermal properties as compared to the first ultrahigh molecular weight polyethylene and the melt processing temperature typically below its melting temperature.

2. The method as claimed in claim 1, wherein the weight proportion of the solvent is not more than 10%.

3. The method as claimed in claim 1, wherein the first and the second ultrahigh molecular weight polyethylenes, and the solvent are melt mixed at a temperature ranging between 110° C. and 160° C.

4. The method as claimed in claim 1, wherein the solvent is selected from the group of solvents consisting of high boiling solvents, low boiling solvents and any combinations thereof.

5. The method as claimed in claim 4, wherein the solvent is a high boiling solvent, said solvent being selected from the group consisting of decalin and paraffin.

6. The method as claimed in claim 4, wherein the solvent is a low boiling solvent, said solvent being selected from the group consisting of acetone, isopropanol, ethyl methyl ketone and any combinations thereof.

7. The method as claimed in claim 4, wherein the solvent is selected from the group consisting of decalin, acetone, paraffin and any combinations thereof.

8. The method as claimed in claim 1, wherein the solvent is acetone with a water content ranging between 80 ppm and 700 ppm.

9. The method as claimed in claim 1, wherein the first ultrahigh molecular weight polyethylene is entangled ultrahigh molecular weight polyethylene having melting temperature (Tm) typically ranging between 132° C. and 138° C. and heat of fusion (ΔH) ranging between 120 to 140 J/g.

10. The method as claimed in claim 1, wherein said first ultrahigh molecular weight polyethylene is melt processed at or above its melting temperature range.

11. The method as claimed in claim 1, wherein the second ultrahigh molecular weight polyethylene is disentangled ultrahigh molecular weight polyethylene.

* * * * *